(12) United States Patent
Herrema, III

(10) Patent No.: US 11,893,005 B2
(45) Date of Patent: Feb. 6, 2024

(54) ANOMALY DETECTION BASED ON AN EVENT TREE

(71) Applicant: BlackBerry Limited, Waterloo (CA)

(72) Inventor: John Raymond Herrema, III, Palo Alto, CA (US)

(73) Assignee: BlackBerry Limited, Waterloo (CA)

( * ) Notice: Subject to any disclaimer, the term of this patent is extended or adjusted under 35 U.S.C. 154(b) by 72 days.

(21) Appl. No.: 17/144,829

(22) Filed: Jan. 8, 2021

(65) Prior Publication Data

US 2022/0222238 A1 Jul. 14, 2022

(51) Int. Cl.
*G06F 16/23* (2019.01)

(52) U.S. Cl.
CPC .................. *G06F 16/2365* (2019.01)

(58) Field of Classification Search
None
See application file for complete search history.

(56) References Cited

U.S. PATENT DOCUMENTS

| | | | | |
|---|---|---|---|---|
| 8,682,812 B1 * | 3/2014 | Ranjan | ................ | H04L 43/028 706/12 |
| 10,045,218 B1 * | 8/2018 | Stapleton | ................ | G06N 5/01 |
| 10,902,062 B1 * | 1/2021 | Guha | ................ | H04L 41/16 |
| 11,294,756 B1 * | 4/2022 | Sadrieh | ................ | G06N 3/047 |
| 2006/0037080 A1 * | 2/2006 | Maloof | ................ | G06F 21/562 726/24 |
| 2009/0323516 A1 * | 12/2009 | Bhagwan | ............ | H04L 41/0856 370/216 |
| 2010/0082664 A1 * | 4/2010 | Odaira | ................ | G06F 16/2246 707/769 |
| 2011/0271146 A1 * | 11/2011 | Mork | ................ | G06F 21/55 714/E11.029 |
| 2012/0254333 A1 * | 10/2012 | Chandramouli | ........ | G06F 40/10 709/206 |
| 2012/0278263 A1 * | 11/2012 | Borthwick | ............ | G06N 20/00 706/12 |
| 2016/0036844 A1 * | 2/2016 | Kopp | ................ | G06N 5/045 726/1 |
| 2020/0042700 A1 * | 2/2020 | Li | ................ | G06F 21/554 |
| 2020/0112578 A1 * | 4/2020 | Gupta | ................ | H04L 63/1441 |
| 2020/0302318 A1 * | 9/2020 | Hetherington | ......... | G06N 20/20 |
| 2020/0389476 A1 | 12/2020 | Sternby et al. | | |
| 2022/0129791 A1 * | 4/2022 | Nia | ................ | G06F 18/2414 |
| 2022/0138321 A1 * | 5/2022 | Shrestha | ............... | G06F 16/285 713/187 |

(Continued)

OTHER PUBLICATIONS

Extended European Search Report issued in European Application No. 21210451.7 dated Apr. 25, 2022, 10 pages.

(Continued)

*Primary Examiner* — Irene Baker
(74) *Attorney, Agent, or Firm* — Fish & Richardson P.C.

(57) ABSTRACT

Systems, methods, and software can be used for anomaly detection. In some aspect, a number of training events are obtained. A data structure represented by a decision tree is generated based on the number of training events. A to-be-scored event is obtained and a traversed path is determined for the to-be-scored event. An anomaly score is computed based on the traversed path and the to-be-scored event is determined to be an anomalous or normal event based on the anomaly score.

20 Claims, 6 Drawing Sheets

(56) References Cited

U.S. PATENT DOCUMENTS

2022/0150264 A1* 5/2022 Friedlander ............ G06N 20/20
2022/0158989 A1* 5/2022 Leung .................... H04L 63/20

OTHER PUBLICATIONS

Stripling et al., "Isolation-based conditional anomaly detection on mixed-attribute data to uncover workers' compensation fraud." Decision Support Systems 111, Jul. 13-26, 2018, 14 pages.
Liu et al., "Isolation forest." 2008 Eighth IEEE International conference on data mining. IEEE, Dec. 2008, 10 pages.

* cited by examiner

ANOMALY DETECTION BASED ON AN EVENT TREE

TECHNICAL FIELD

The present disclosure relates to anomaly detection based on a decision tree.

BACKGROUND

Anomaly detection is frequently employed in security solutions to detect unusual patterns in network or application usage or other aspects of behavior that may be indicative of malicious actors or malware activity. Existing techniques are used to detect anomaly using large number of variables with unknown priorities or relevance and continuous variables with unknown value ranges and splitting values. In some instances, the splitting effectiveness of the variables is unknown due to lack of domain knowledge and known characteristics of network events variables. This can reduce the efficacies of the usage of the computer resources (e.g., processors, memories) and networking resources.

DESCRIPTION OF DRAWINGS

Like reference numbers and designations in the various drawings indicate like elements.

DETAILED DESCRIPTION

Figure 1:
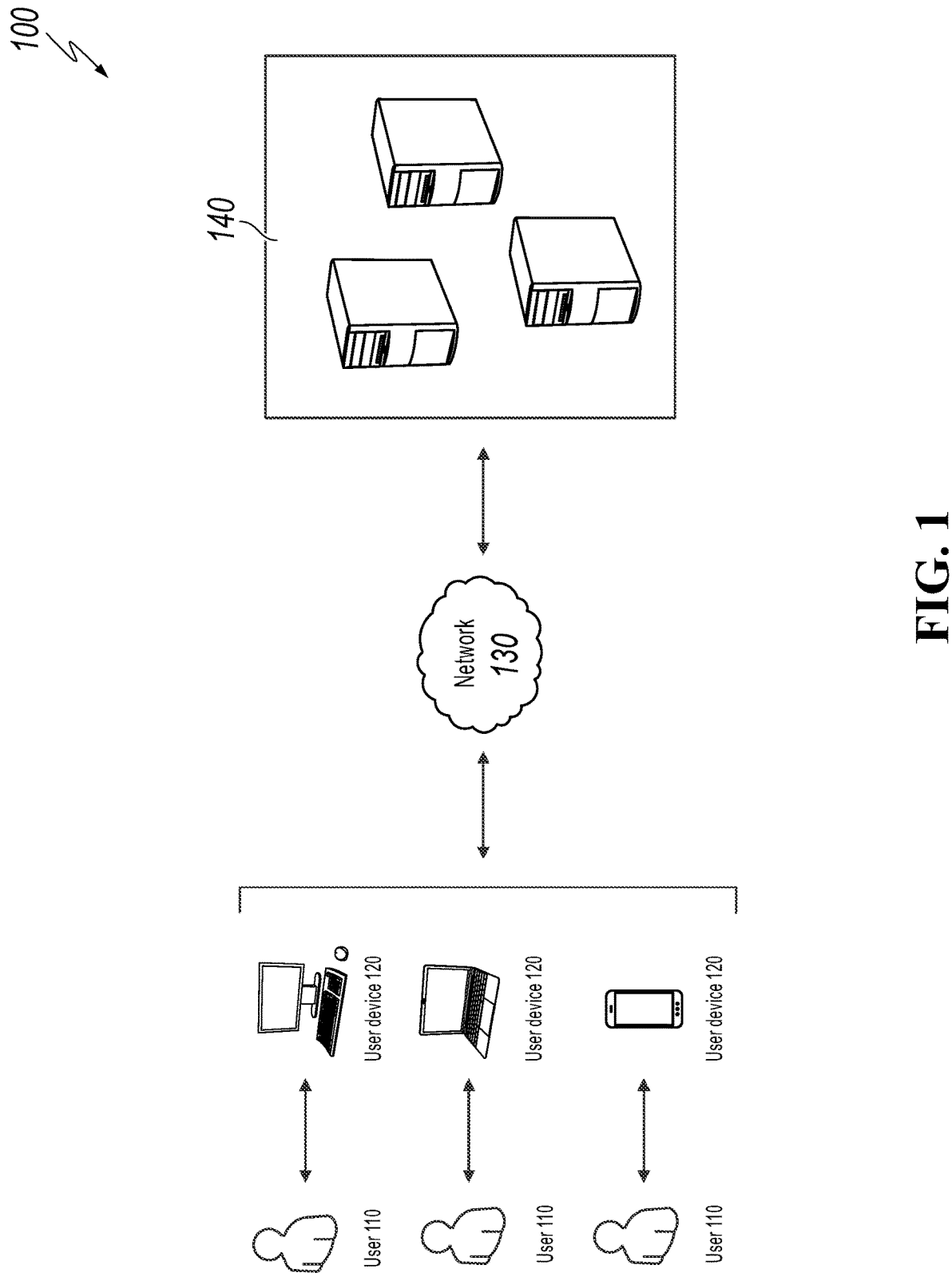
FIG. 1 is an example system for anomaly detection according to an implementation.

Anomalies are data patterns that have different data characteristics from normal instances. The detection of anomalies has significant relevance and often provides critical actionable information in various application domains. For example, anomalies in credit card transactions could signify fraudulent use of credit cards. An anomalous spot in an astronomy image could indicate the discovery of a new star. An unusual computer network traffic pattern could stand for an unauthorized access. These applications demand anomaly detection algorithms with high detection performance and fast execution. Some existing model-based approaches to anomaly detection construct a profile of normal instances, then identify instances that do not conform to the normal profile as anomalies. Notable examples such as statistical methods, classification-based methods, and clustering-based methods use this general approach. In these approaches, the anomaly detector can be optimized to profile normal instances, but may not be optimized to detect anomalies. As a consequence, the results of anomaly detection may include false alarms, e.g., having normal instances identified as anomalies, or too few anomalies being detected. Some existing methods are constrained to low dimensional data and small data size because of their high computational complexity. Unlike the existing approaches that are either not optimized or having high computational complexity, Isolation Forest is an unsupervised learning algorithm for anomaly detection that works on the principle of isolating anomalies. The basis of the Isolation Forest algorithm is that the tendency of those anomalous instances in a dataset are relatively easier to separate or isolate from the rest of the sample compared to normal points. In order to isolate a data point, the method recursively generates partitions on the samples by randomly selecting an attribute and then randomly selecting a splitting value for the attribute between the minimum and maximum values allowed for that attribute.

Isolation Forest, as a generalized technique, is well-suited to cases where one or more of the following apply: large numbers of variables with unknown priority or relevance; continuous variables with unknown value ranges and splitting values; variables whose splitting effectiveness is unknown. In such cases, random tree generation employed by Isolation Forest allows isolation to be performed without prior knowledge of variable effectiveness or splitting conditions, and avoids bias in random feature or split value selection where variables or values may be more or less or less able to isolate particular instances.

Anomaly detection techniques based on an event tree as described herein is an optimized implementation of Isolation Forest technique for anomaly detection, which is based on the principle that anomalous instances are necessarily infrequent and dissimilar from normal instances and therefore require fewer decision tree splitting conditions to be applied to isolate them. Unlike Isolation Forest method, the described anomaly detection techniques leverage domain knowledge and known characteristics of event variables to apply more computationally efficient isolation that requires fewer trees to be fitted. The described anomaly detection techniques can be implemented to avoid masking, and have consistent tree structure that enables transparency and additivity. The anomaly techniques based on an event tree will be described in greater detail below with reference to FIGS. 1-4.

FIG. 1 is an example system 100 for anomaly detection according to an implementation. At a high level, the example system 100 includes one or more user devices 120, a network 130, and one or more servers 140. In general, the system 100 can be implemented to detect anomalous events or data. In one example, the events as described herein can include network session events, mobile application usage events, location change events, etc. In some examples, the events can include any suitable types of events.

In one example, a user (e.g., user 110) may access a mobile application on a computing device (e.g., user device 120) and generate a number of mobile application usage events. In one example, a mobile application usage event can be defined by one or more features or attributes including, for example, a particular "function" used, how "frequently" the user accesses the application or uses a particular function, "when" the user accesses the application or uses a particular function, etc. In one example, a number of network access events may be collected by the system 100. In one example, a network access event can be defined by one or more features or attributes including, for example, the "HOST" accessed, whether the host is an "internal" or "external" host, whether the session is characterized as "upload" or "download," the "size" of a file or application data payload that was uploaded to or downloaded from the host, and a particular "day of week" or "hour of day" the session occurs, etc. The system 100 can collect data on all of the mobile application usage events or network access events and feed the data to a model which will be trained using the data. Then, the system 100 can compare subsequent input events to the trained model to determine anomalous events among the subsequent input events.

In the shown example, events resulting from operations of users 110 using user devices 120 can be collected by the servers 140 via the network 130. The servers 140 can use the collected events as training events to generate a data structure represented by a decision tree, such as the event tree structure as described herein, which will be described in greater detail below with reference to FIGS. 2-3. In some cases, each event may be associated or assigned a class label. When assigning a class label to an event, the class label may be specific to a device, or to a user, or, e.g., to a group of users with some common attribute that may be used to label them and their events (e.g., all "Product Managers"). As such, the event tree can track metrics for each class. In some cases, in addition to performing anomaly detection across events as a whole, it can also assign a class probability to the events. In one example, an event that is normal overall may be yet unusual for "Product Managers" as a class. Such designed-in feature of the event tree allows to use both the anomaly score and class probability together to make improved possible decision.

In some cases, the servers 140 may generate a decision tree for each of the user devices 120 using the events related to a particular user device 120. In some cases, the servers 140 may generate a decision tree for a class of devices of the same type. In some cases, the servers 140 may generate a decision tree for a class of devices within a particular organization (e.g., within a corporate network). The servers 140 may periodically updated the decision tree, for example, when false anomalies are detected. The servers 140 can further map a to-be-scored event to the event tree and compute an anomaly score for the event. Based on the computed anomaly score, the servers 140 can determine whether the event is an anomalous event. In one example, if the computed anomaly score is higher than a pre-determined threshold, the event can be determined as an anomalous event. The detection of anomalies using the described decision tree techniques improves the security of the user devices and the network, as it can identify and prevent abnormal (which could be malicious) actions such as cyber security attacks, fraudulent actions, network intrusion, etc. For example, in malware detection whereby a compromised device may be extremely likely to connect to malware 'command and control' host or to other devices in order to spread infection that no legit user/device would otherwise access in normal course of operation. In another example, the malicious actor may be another user other than a legitimate user who then engages in unusual pattern of attempted host access (e.g., based on lost/unattended device that has not yet timed out).

Turning to a general description, a user device, e.g., the user devices 120, may include, without limitation, any of the following: computing device, mobile electronic device, user device, mobile station, subscriber station, portable electronic device, mobile communications device, wireless modem, wireless terminal, television, printer or other peripheral, vehicle, or any other electronic device capable of sending and receiving data. Examples of a mobile device may include, without limitation, a cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

Network 130 includes any suitable networks operable to support communication between components of system 100. Network 130 may include any type of wired or wireless communication channel capable of coupling together computing nodes. Network 130 may include any interconnecting system capable of transmitting audio, video, electrical signals, optical signals, data, messages, or any combination of the preceding. Network 130 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100. Network 130 may be configured to support any communication protocols as would be appreciated by one of ordinary skill in the art upon viewing this disclosure.

Servers 140 include any suitable storage scheme including any software, hardware, firmware, and/or combination thereof capable of storing and processing information. Exemplary servers 140 include individual data storage devices (e.g., memory, disks, solid-state drives), which may be part of individual storage engines and/or may be separate entities coupled to storage engines. Servers 140 may store third-party databases, database management systems, a file system, and/or other entities that include or that manage data repositories.

Figure 2:
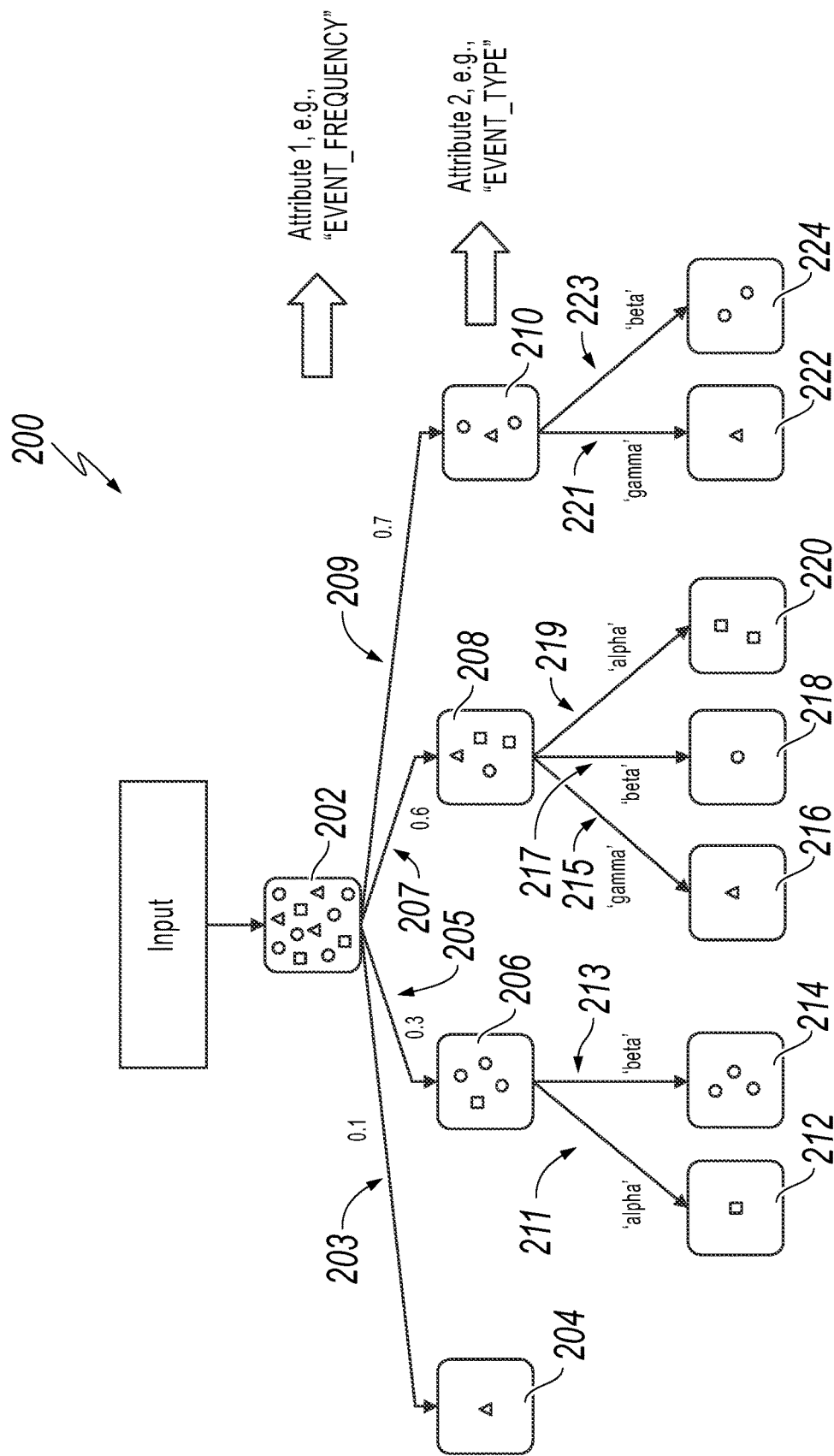
FIG. 2 is an example event tree according to an implementation.

FIG. 2 is an example event tree 200 according to an implementation. In general, an event tree can have an N-ary decision tree structure where a parent node can have either an arbitrary number of children or up to n children depending on whether the variable used for splitting condition is categorical or a numeric variable. In some cases, categorical variables can have as many children as observed unique values for the variable in the node's samples. Numeric variables can be discretized to one of n possible values between a minimal value and a maximum value, and can have as many children as observed unique values after discretization for the variable in the node's samples.

The anomaly detection techniques as described herein can use a single 'n-ary' decision tree for isolating samples with feature importance. Because an 'n-ary' tree structure can support multiple children per parent node, random threshold value selection is not required to isolate instances based on observed values of a particular feature. Instead, for attributes or features whose values are categorical, child nodes may be created for each categorical value observed in parent node's samples. For attributes or features whose values are continuous or already discretized, discretization may be applied based on observed minimum and maximum values and child nodes may be created for each discretized value observed. This approach allows samples to be split across child nodes in a single step without requiring multiple iterations across each sample for each feature to determine 'best' threshold values when using a binary tree structure.

An event tree can include a number of event nodes. Each event tree includes a root node and each event node can be a leaf node or a non-leaf node. The event tree can include one or more branches or edges linking the event nodes. Each non-leaf node can be a parent node associated with at least one branch based on a number of child nodes associated with the parent node. Each leaf node is a child node of a non-leaf (e.g., a parent node) and has no child nodes. Each leaf node can be associated with one and only one branch of the event tree. In some cases, each non-leaf node is associated with one event attribute and each branch below a non-leaf node represents an attribute value of the attribute represented by the non-leaf node. In other cases, each non-leaf node is associated with a tuple of attributes, and each branch below a non-leaf node represents a permutation of values for the non-leaf nodes attributes. In some cases, child nodes of a non-leaf node can be associated with branches represented by different values for a single attribute; in others they are represented by a permutation of values for a tuple of attributes. In some cases, each attribute is associated with an importance level. In one example, the non-leaf nodes in the event tree can be arranged in the event tree based on the importance level of the attributes. In some cases, a non-leaf node of the event tree that represents an attribute having a highest importance level is a root node of the decision tree. In one example, the event nodes of the event tree can be arranged in different layers associated with different attributes. Each tree is arrange in layers based on its attributes in order of importance. In one example, a 'grove' of multiple event trees can be constructed where each tree is still based on importance of attributes. In this example, the importance of the attributes may be permutated across the grove. It may be decided that attribute 'HOST' (indicating a host that was accessed) is always the most important attribute, but a two tree grove may be obtained based on one instance where 'HOST' is most important attribute, 'WDAY' (indicating a day in the week when the host was accessed) is second most important attribute, and 'HOUR' (indicating an hour in the day when the host was accessed) is the least important attribute, and one instance where 'HOST' is the most important attribute, 'HOUR' is the second most importance attribute, and 'WDAY' is the least important attribute. If a fourth attribute is selected, those whose importance was known to be less important than either 'HOUR' or 'WDAY' may be needed and no additional trees can be required in grove. If the importance of the fourth attribute was also unknown, 8 trees can be needed in the grove. In another embodiment of the disclosure, attributes such as "upload" (indicating an upload direction of communication with a host) or "download" (indicating a download direction of communication with a host) or "size" (of payload used in communications associated with the event) and "frequency" or "date" can be used to detect anomalies related to covert channel which is a threat to the confidentiality of a system. Indeed, an anomaly related to events associated with data exfiltration through covert channel can be detected via the use of a decision tree according to one embodiment of the disclosure, especially when the "size" attribute value belongs to unusual range of size value.

As shown in the example of FIG. 2, the event tree 200 includes event nodes 202, 204, 206, 208, 210, 212, 214, 216, 218, 220, 222, and 224. Nodes 204, 212, 214, 216, 218, 220, 222, and 224 are leaf nodes because they do not have any child nodes. Nodes 202, 206, 208, and 210 are non-leaf nodes. Branches 203, 205, 207, 209, 211, 213, 215, 217, 219, 221, 223 are configured to link the event nodes. For example, non-leaf node 202 is linked to the leaf node 204 and the non-leaf nodes 206, 208, and 210 by branches 203, 205, 207, and 209, respectively. In the example, non-leaf node 202 is the parent node of the nodes 204, 206, 208, and 210. Each of the leaf nodes 204, 212, 214, 216, 218, 220, 222, and 224 are child nodes of non-leaf nodes. In the example, the leaf node 204 is a child node of the non-leaf node 202. The leaf node 212 and 214 are child nodes of the non-leaf node 206. The leaf node 216, 218, and 220 are child nodes of the non-leaf node 208. The leaf node 222 and 224 are child nodes of the non-leaf node 210.

Each node of the event tree 200 is associated with an event attribute-value pair or tuple of attribute-value pairs. In some cases, the event nodes of the event tree can be arranged in different layers and each layer can be associated with a different attribute. In the shown example, non-leaf node 202 is associated with the attribute "EVENT_FREQUENCY" indicating a frequency of an event occurring. The non-leaf nodes 204, 206, 208, and 210 are arranged in the same layer below node 202 and are associated with the attribute "EVENT_TYPE" indicating a type of an event. Each of the branches 203, 205, 207, and 209 below the node 202 represents a unique value of the attribute associated with the non-leaf node 202. In the shown example, branches 203, 205, 207, and 209 represent values "0.1," "0.3," "0.6," and "0.7" of the attribute "EVENT_FREQUENCY," respectively. Branches 211, 213, 215, 217, 219, 221, and 223 represent values "alpha," "beta," "gamma," "beta," "alpha," "gamma," and "beta" of the attribute "EVENT_TYPE," respectively. As noted, child nodes of a non-leaf node can be associated with branches each represented by a different attribute value. In the example, child nodes 212 and 214 of the parent node 206 are associated with branches 211 and 213 represented by different values "alpha" and "beta." Child nodes 216, 218, and 220 of the parent node 208 are associated with branches 215, 217, and 219 represented by different values "gamma," "beta," and "alpha." Child nodes 222 and 224 of the parent node 210 are associated with branches 221 and 223 represented by different values "gamma" and "beta."

In the shown example, each of the attributes "EVENT_FREQUENCY" and "EVENT_TYPE" have an importance level. The attribute "EVENT_FREQUENCY" has an importance level that is relatively higher than the importance level of the attribute "EVENT_TYPE," and as such it is associated with a higher layer in the event tree. The non-leaf node 202 is associated with the attribute with a higher importance level, and is the root node of the event tree 200. In the example, the nodes of the event tree 200 are arranged based on the importance level of the attributes associated the nodes. The nodes are associated with an attribute with a layer in the tree that increases as importance decreases. Thus, leaf nodes can be associated with least important attribute. As shown, because the non-leaf nodes 206, 208, and 210 are associated with the attribute "EVENT_TYPE" which has a lower importance level than the attribute "EVENT_FREQUENCY" with which the non-leaf node 202 is associated, the nodes 206, 208, and 210 are arranged in a lower layer in the event tree 200 than the node 202.

Because events are differentiable from one another based on these, or other, attributes and possible values for the attributes, efficient n-way splitting can be performed using the described 2-layer tree structure based on attribute ordering as follows: [EVENT_FREQUENCY, EVENT_TYPE] (or other ordering of other attributes).

In operation, a training dataset including data points having some attributes or features can be successively split based on importance of the features or attributes and the observed values for the attributes. In some cases, the training data set may be set to have a predetermine size or size range so that the detection of false anomalies is reduced. Each non-leaf node is a splitting point based on a certain attribute (or attribute tuple) and an observed value for the attribute (or a tuple of observed values for each attribute in the attribute tuple). New tree nodes are iteratively generated using the subsets, or 'splits' of data points generated from the previous step where all the data points in a 'split' will have the same value(s) for the attribute(s) used at the splitting point. In the shown example, a set of training events can be input to the event tree 200 and are mapped to the root node 202. Each of the training events can be associated with the attribute set [EVENT_FREQUENCY, EVENT_TYPE]. Each training event can have an attribute value for each of the attributes. In one example, a first training event may have attribute values "0.3" and "alpha" for the attributes "EVENT_FREQUENCY" and "EVENT_TYPE," respectively, thus have the attribute-value pairs (EVENT_FREQUENCY, 0.3) and (EVENT_TYPE, alpha). A second training event may have attribute-value pairs (EVENT_FREQUENCY, 0.6) and (EVENT_TYPE, gamma). A child node of a non-leaf node represents a subset of training events mapped to a parent node of the child node. In the example, the node 204 represents the training event having attribute-value pair (EVENT_FREQUENCY, 0.1). The node 206 represents the training events having the attribute-value pair (EVENT_FREQUENCY, 0.3). In the lowest layer of the event tree 200, the leaf node 212 represents training events having attribute-value pairs (EVENT_FREQUENCY, 0.3) and (EVENT_TYPE, alpha). In all cases, the sum number of the training events represented by each child node of a parent node is equal to the number of training events represented by the parent node. For example, the sum of the number of the training events represented by the nodes 204, 206, 208, and 210 is equal to the number of the training events represented by the root node 202. In another embodiment of the disclosure, the selection of attributes, and the hierarchy of the attributes are obtained from the use of a machine learning algorithm that takes as input threats or attacks (similar to attack vector metric values used in the Common Vulnerability Scoring System (CVSS)) for a system.

Figure 3:
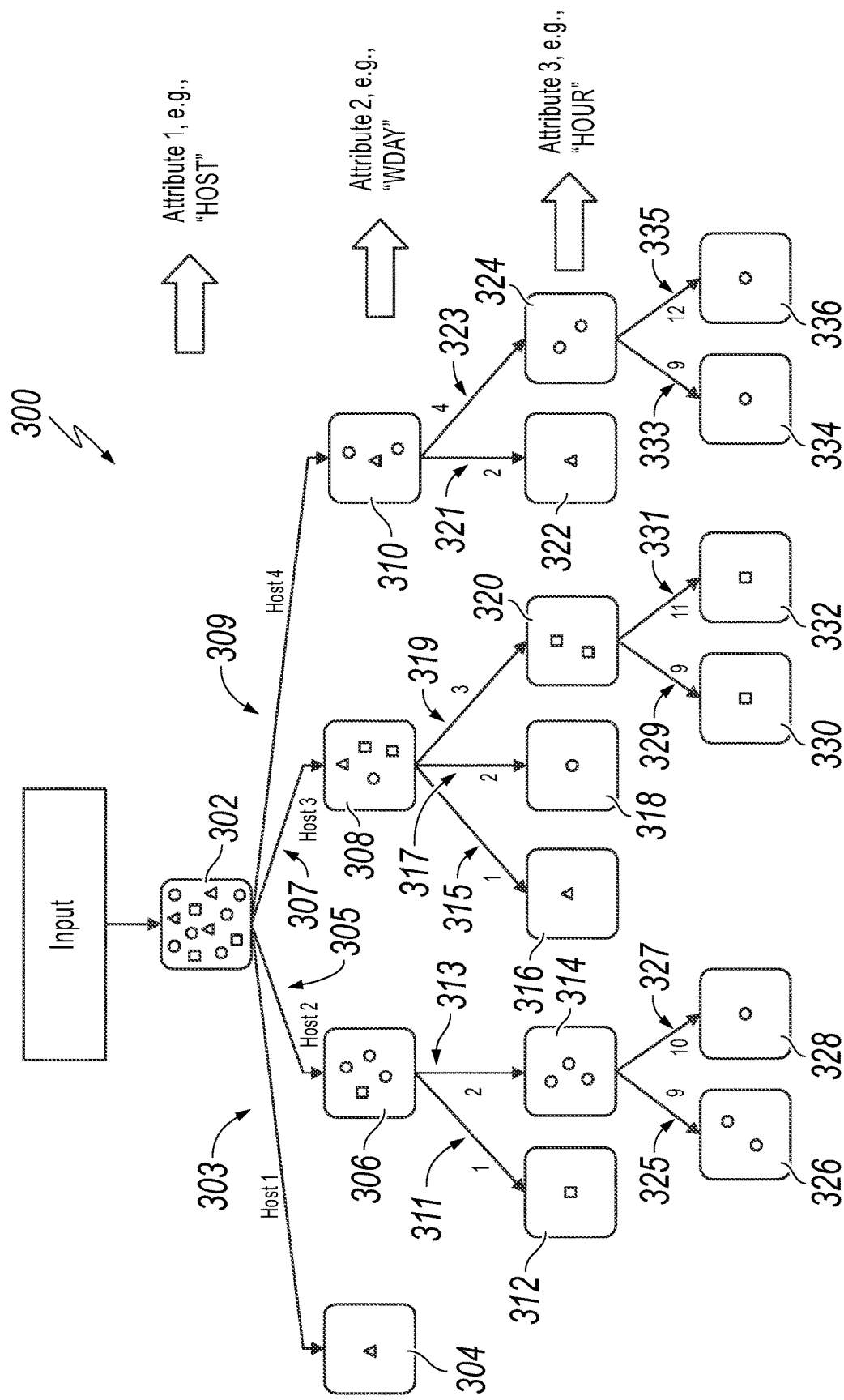
FIG. 3 is an example event tree according to an implementation.

FIG. 3 is an example event tree 300 according to an implementation. As shown in the example of FIG. 3, the event tree 300 includes event nodes 302, 304, 306, 308, 310, 312, 314, 316, 318, 320, 322, 324, 326, 328, 330, 332, 334, and 336. The non-leaf node 302 is the root node of the event tree 300. Nodes 304, 312, 316, 318, 322, 326, 328, 330, 332, 334, and 336 are leaf nodes because they do not have any child nodes. Nodes 302, 306, 308, 310, 314, 320, and 324 are non-leaf nodes. Branches 303, 305, 307, 309, 311, 313, 315, 317, 319, 321, 323, 325, 327, 329, 331, 333, and 335 are configured to link the events nodes.

Each node of the event tree 300 is associated with an attribute. The events nodes of the event tree can be arranged in different layers associated with different attributes. Each of the attributes has a respective importance level so that the events nodes can be arranged in successive layers of the event tree based on the importance level of associated attributes. In the shown example, splitting can be performed using the illustrated 3-layer tree structure based on attribute ordering from highest to lowest importance level as follows: [HOST, WDAY, HOUR]. In the example, non-leaf node 302 is arranged in a top layer and is associated with the attribute "HOST" indicating a host that was accessed. Nodes 304, 306, 308, and 310 are arranged in a second layer and are associated with the attribute "WDAY" indicating a day in the week when the host was accessed. The non-leaf nodes 312, 314, 316, 318, 320, 322, and 324 are arranged in a third layer and are associated with the attribute "HOUR" indicating an hour in the day when the host was accessed. Each of the branches below the non-leaf node represents an attribute value of the attribute associated with the non-leaf node. In the shown example, branches 303, 305, 307, and 309 represent attribute values "Host1," "Host2," "Host3," and "Host4" of the attribute "HOST," respectively. Branches 311, 313, 315, 317, 319, 321, and 323 represent attribute values "1," "2," "1," "2," "3," "2," and "4" of the attribute "WDAY," respectively. Branches 325, 327, 329, 331, 333, and 335 represent attribute values "9," "10," "9," "11," "9," and "12" of the attribute "HOUR," respectively. Child nodes of a non-leaf node are associated with branches represented by different attribute values. In the example, child nodes 312 and 314 of the parent node 306 are associated with branches 311 and 313 represented by different values "1" and "2." Child nodes 316, 318, and 320 of the parent node 308 are associated with branches 315, 317, and 319 represented by different values "1," "2," and "3." Child nodes 326 and 328 of the parent node 314 are associated with branches 325 and 327 represented by different values "9" and "10."

In the shown example, training events mapping to the root node 302 can be split based on importance of the attributes. The training events are split into subsets that contain the different observed values for the attributes. Each node is a splitting point based on a certain attribute. In the shown example, each of the training events can be associated with the attribute set [HOST, WDAY, HOUR]. Each training event can have an attribute value for each of the attributes. As shown, the training events mapping to the root node 302 are split into multiple subsets based on the observed attribute values of the attribute "HOST." In the example, a first subset of the training events maps to node 304 and has the attribute-value pair (HOST, Host1), a second subset of the training events maps to the node 306 and has the attribute-value pair (HOST, Host2), a third subset of the training events maps to the node 308 and has the attribute-value pair (HOST, Host3), and a fourth subset of the training events maps to the node 310 and has the attribute-value pair (HOST, Host4). The training events mapping to the nodes 306, 308, and 310 are further split based on the other attributes.

Figure 4:
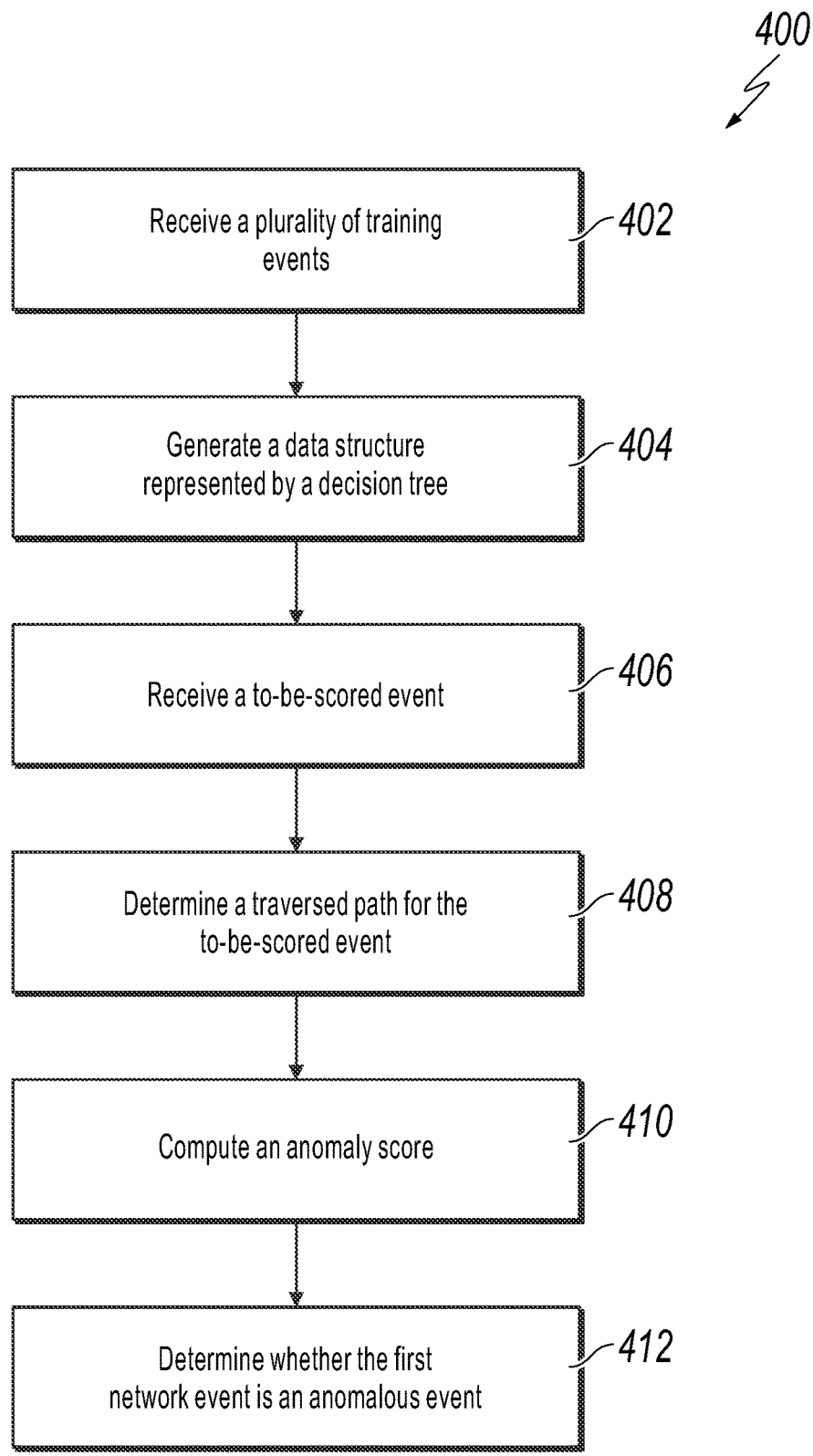
FIG. 4 is a flowchart showing an example process for anomaly detection according to an implementation.

FIG. 4 is a flowchart showing an example process 400 for anomaly detection according to an implementation. The process 400 can be implemented by an anomaly detection system, e.g., the system 100 shown in FIG. 1. The example process 400 shown in FIG. 4 can be implemented using additional, fewer, or different operations, which can be performed in the order shown or in a different order.

The anomaly detection technique as described herein can be based on principles of following: normal instances are those that are observed frequently and/or require more splitting conditions to be applied to isolate them from other instances and therefore map to lower layers (with deeper depth) within event tree; conversely, anomalous instances are those that are observed infrequently and/or require fewer splitting conditions and therefore map to higher layers (with shallower depth) within event tree. In some cases, it may be not possible for an instance that both requires more splitting conditions to be applied and occurs frequently to be an anomaly.

The process 400 starts at step 402 where a plurality of training events are received. Each of the plurality of training events is associated with one or more attributes, and each of the one or more attributes has an attribute value.

At step 404, a data structure represented by a decision tree (e.g., event tree 200 and 300) is generated based on the plurality of training events. In some cases, the decision tree includes a root node, one or more non-leaf nodes, and one or more branches, and one or more leaf nodes. Each of the nodes represents or is associated with one attribute. Each branch below a non-leaf node represents an attribute value of an attribute represented by the non-leaf node. In some cases, each of the attributes is associated with an importance level, which determines the order in which splitting based on attributes and values occur. The leaf nodes of the decision tree can be associated with the least important attribute. In one example, the decision tree may have 3-layer tree structure based on attribute ordering from highest to lowest importance level as [HOST, WDAY, HOUR] with reference to FIG. 3.

In some cases, each of the nodes can be associated with a permutation of attribute values (also known as a 'tuple' of attribute values) occurring in the plurality of training events for two or more of the plurality of attributes (also known as a 'tuple' of attributes). Each of the non-leaf nodes is a parent node associated with at least one branch of the decision tree based on the number of child nodes associated with the parent node. Each of the leaf nodes is a child node of a non-leaf node of the decision tree and has no child nodes. Each of the leaf nodes is associated with only one branch of the decision tree and there can be only one 'path' from the root node to each leaf node.

In some cases, child nodes of a non-leaf node are associated with branches represented by different attribute values. For example, no two child nodes are associated with branches with the same attribute value for the parent node's attribute. In some cases, a same value can be associated with branches of two different nodes and multiple paths can be obtained from root node to leaf nodes. A child node of a non-leaf node represents a subset of training events mapping to a parent node of the child node. In some cases, a non-leaf node of the decision tree that represents an attribute having a highest importance level is a root node of the decision tree.

In some cases, the attributes can be known characteristics associated with the training events based on historical data of previous events or necessarily occurring attributes of the class of events and may have known ranges of possible values. In one example, the training events may be network session events. In this example, it may be known in advance that each network session involves accessing a "host" that is either "internal" or "external." It may be known in advance that each "session" may be characterized as being an "upload" or "download." It may be known in advance that each session will involve uploading or downloading a limited and non-negative number of bytes of data (due to UDP/TCP protocol requirements). It may be known in advance that each session will occur during a particular "month," on particular "day of week" and "hour of day," etc. Thus, it may be known on a prior basis that it is possible to isolate one network session from another based on "host" accessed, whether "internal" or "external," whether "upload" or "download," "size" of payload, and date time attributes. This can allow splitting and anomaly isolation to be performed more efficiently because features and splitting conditions may not need to be randomly selected and then iteratively tested for their effectiveness before the 'best' condition can be selected. The application of importance also eliminates the potential for 'masking' whereby values across one or more less important attributes may be similar enough to previously observed values to causes an event to be deemed 'normal' despite its not matching any previously observed values for one or more important attributes.

At step 406, a to-be-scored event is received. The to-be-scored event has one or more attributes and one or more attribute values of the one or more attributes. In one example, the to-be-scored event may be a network access event having attribute-value pairs (HOST, Host2), (WDAY, 2), and (HOUR, 9).

At step 408, a traversed path is determined for the to-be-scored event by mapping the one or more attributes and the one or more attribute values of the to-be-scored event to the decision tree.

The traversed path is determined by determining the non-leaf nodes and/or leaf nodes in the decision tree to which the to-be-scored event mapped starting with the most important attribute and continuing with one or more attributes of the to-be-scored event until the event no longer maps to any node.

In one example, to determine the traversed path, a first child node of the root node to which the to-be-scored event maps can be determined as follows. First, it is determined whether the to-be-scored event has an attribute value for a first attribute (e.g., the attribute with the highest importance level). If the to-be-scored event has an attribute value for the first attribute, it is then determined whether the attribute value matches an attribute value of any branches associated with the root node. If a branch with a matching attribute value is found, a child node associated with the branch can be determined as the first child node. If the to-be-scored event does not map to any first child node, it is determined that the to-be-scored event has an "empty" traversed path with zero traversed nodes.

In some cases, it may be determined whether an attribute value of the to-be-scored event matches an attribute value of the event tree based on attribute type. In one example, when performing matching for a categorical attribute such as "HOST," an 'exact' match may be performed to find whether the attribute value of the to-be-scored event exactly matches an attribute value of the event tree. In another example, when performing matching for a discretized attribute such as "FREQUENCY," a 'nearest' match may be performed to find whether the attribute value of the to-be-scored event is within in a predetermined range of an attribute value of the event tree. For example, if the decision tree comprises a "size" attribute of a file or application data payload that was uploaded to or downloaded from a host value, the "size" attribute values can be value ranges such as [0, 512 kilobytes], [513 kilobytes, 1024 kilobytes], etc.

In some cases, after determining the first child node for the to-be-scored event, a second child node of the decision tree to which the to-be-scored event maps can be determined. The second child node is a child node of the first child node. In one example, a second attribute is determined. The second attribute has an importance level lower than that of the first attribute but higher than any other attributes. Then, it is determined whether the to-be-scored event has an attribute value for the second attribute and whether the first child node has any child nodes. If it is determined that the to-be-scored event has an attribute value of the second attribute that matches an attribute value of any branch associated with the first child node, the second child node can be determined as a child node of the first child node that is associated with the matching branch. The second child node can then be added to the traversed path for the to-be-scored event. If the second child node cannot be found, the path traversal for the to-be-scored event is terminated. If the second child node is not a leaf node, a third node can be determined using the same steps for determining the first and second child nodes. For the n attributes, the previous steps for traversal can be repeated until no n-th child node can be found, or the (n−1)-th child node is a leaf node.

At step 410, an anomaly score is computed for the to-be-scored event base on the traversed path. The traversed path can include zero, or one or more nodes, up to the number of attributes of the to-be-scored event. If the traversed path has zero node, a path length of zero can be assigned to the traversed path. If the traversed path has one or more nodes, a path length for each node in the traversed path can be determined. The path length for the to-be-scored event can be determined as the sum of the path lengths of each node in the traversed path. An average path length is further determined for the branches associated with the first child node or for the branches associated with all children for the first child node's parent. In the example, the path length for a branch can be determined as a sum of the path lengths for the nodes associated with the branch. The anomaly score for the to-be-scored event can be determined based on the path length for the to-be-scored event relative to the determined average path length with greater than average path length indicating a more 'normal' event and less than average path length indicating a more 'anomalous' event.

In some cases, the average path length can be chosen to the average of all branches in the decision tree, or the average of the branches for all children of the first child node's parent, instead of the branches associated with the first child node to which the to-be-scored event maps.

At step 412, it is determined whether the to-be-scored event is an anomalous event based on the anomaly score. In some cases, if the anomaly score of the to-be-scored event is equal to or higher than a pre-determined threshold, the to-be-scored event can be determined to be an anomalous event. If the anomaly score of the to-be-scored event is lower than the pre-determined threshold, the to-be-scored event can be determined to be a normal event.

The steps 402-412 may be performed by a same operator. For example, the steps 402-412 may be performed by a same server (e.g., server 140). In some cases, the steps 402-412 may be performed separately by different operators. For example, the steps of obtaining and generating the event tree may be performed by a first server, while the steps of determining the traversed path and computing the anomaly score may be performed by a second server that is different from the first server.

With reference to the description of FIGS. 1-4, the anomaly detection techniques based on event tree as described herein can provide following technical effects. The described anomaly detection techniques can require only one decision tree to be implemented, or alternatively a very small number of decision trees compared to standard methods that can requires as significant number of trees, generally on order of 100 or possibly more. This is because the described anomaly detection techniques take advantage of known attributes of event inputs and/or domain of application to: (i) define splitting conditions in an efficient and consistent way that does not rely on random selection of splitting conditions across a large forest of trees to avoid bias based on purely random selection and (ii) apply feature importance where if relative importance of chosen attributes is known, then only one tree need be trained; alternatively, if relative importance of a subset of chosen attributes is known, then often only a smaller 'grove' of trees need be trained of size=factorial(n_subset) where n is the number of chose attributes and n_subset is the number of attributes whose relative importance is known.

The described anomaly detection techniques can provide importance ordered attribute selection. When attributes used to model a given class of events are selected, they are explicitly ordered in order of importance. This ensures that differences with respect to most important attributes will cause anomalous instances to be isolated sooner. The described anomaly detection techniques can provide deterministic n-way splitting as opposed to random binary splitting. In many domains of application of the event tree, the features or attributes used as basis for modeling a given class of events are often "categorical" or "Boolean" with either required or otherwise known possible values/value ranges. As such, splitting conditions are knowable in advance and can be more efficiently and consistently applied using n-way splitting as opposed to successive random binary splitting. For example, when modeling "network access events," it can be known in advance that: the attribute "HOST" from which data is sent/received will have a unique "hostname," which is a categorical feature where specific values may not be known a priori, but are nevertheless practically limited and always differentiable based on simple string-based comparison; the attribute "DIRECTION" will be "inbound" or "outbound," which is an example of a "Boolean" feature with two known possible values; the attribute "TRANSPORT" will be based or "udp", "tcp", or "tls," which is an example of a categorical feature with three known possible values; the attribute "APP PROTOCOL" will be integer value between 0-65335, which is an example of a discretized feature with 65334 known possible values within proscribed range.

The described anomaly detection techniques can provide divergence tracking. Because layers are consistently defined if a given event input has an attribute-value pair that does not match any previously observed event instances, it can be known at which layer in the tree it diverged and also if there were any layers prior to that layer where it did match. This can be used to not only calculate the same anomaly score as standard Isolation Forest based on how deep we had to go before divergence occurred, but it also allows us to return explicit info on the path traversed up to the point of divergence, and also the specific attribute and value that led to divergence. Standard Isolation Forest may perform similar tracking. But because the Isolation Forest relies on "average across all trees in forest", there can be no single consistent path or point of divergence. Because trees are randomly generated, there may be as many paths and points of divergence as there are trees in forest.

The described anomaly detection techniques can avoid masking whereby anomalous patterns are disguised because they are similar enough with respect to a subset of less important event attributes, even though they are highly dissimilar with respect to most important event attributes. For example, network access events may be modeled based on a combination of the "host" accessed, the "day of week" accessed, the "hour of day" accessed, and the "frequency" with which the "host" was accessed during each "hour of day" for each "day of week" the host has been accessed. An Isolation Forest based on these attributes or "features" of host access may deem access to a host that was "never accessed before by any user" as being normal if other less important attributes of access such as "day of week," "hour of day," and "frequency" otherwise mirror patterns of access to other hosts that are frequently accessed. Unlike Isolation Forest, the described anomaly detection techniques based on an event tree can explicitly avoid this type of masking by constructing decision tree(s) in a non-random fashion whereby the most important attribute can always be top layer in each tree. Failure of an input to conform to past observances with respect to most important, e.g., primary attribute, will result in the input being immediately isolated as anomalous irrespective any secondary attribute similarity. Failure of an input to conform to past observances with respect to one or 'more important' attributes, will also be more likely to result in the input being more quickly isolated as anomalous, even if it does conform with respect to 'most important' attribute.

The described anomaly detection techniques can support transparency where models are able to provide not just a numeric anomaly score, but also the reason why the input was deemed anomalous. This contrasts with standard Isolation Forest implementation where the models return a numeric anomaly score, but are not able to provide context on why the input was deemed anomalous. A factor in this lack of transparency is Isolation Forest's use of a large forest of randomly generated binary trees that have varying topology and use different and randomly generated splitting conditions to isolate instances and also require categorical attribute values to be converted to a 'multi-feature' binary-encoded representation. The combination of forest size, topology variance, and 'multi-feature' encoding can make it difficult and computationally expensive to map a given input to all of the paths traversed across all trees in its forest and then translate into a human understandable reason why the input received the score it did.

Figure 5:
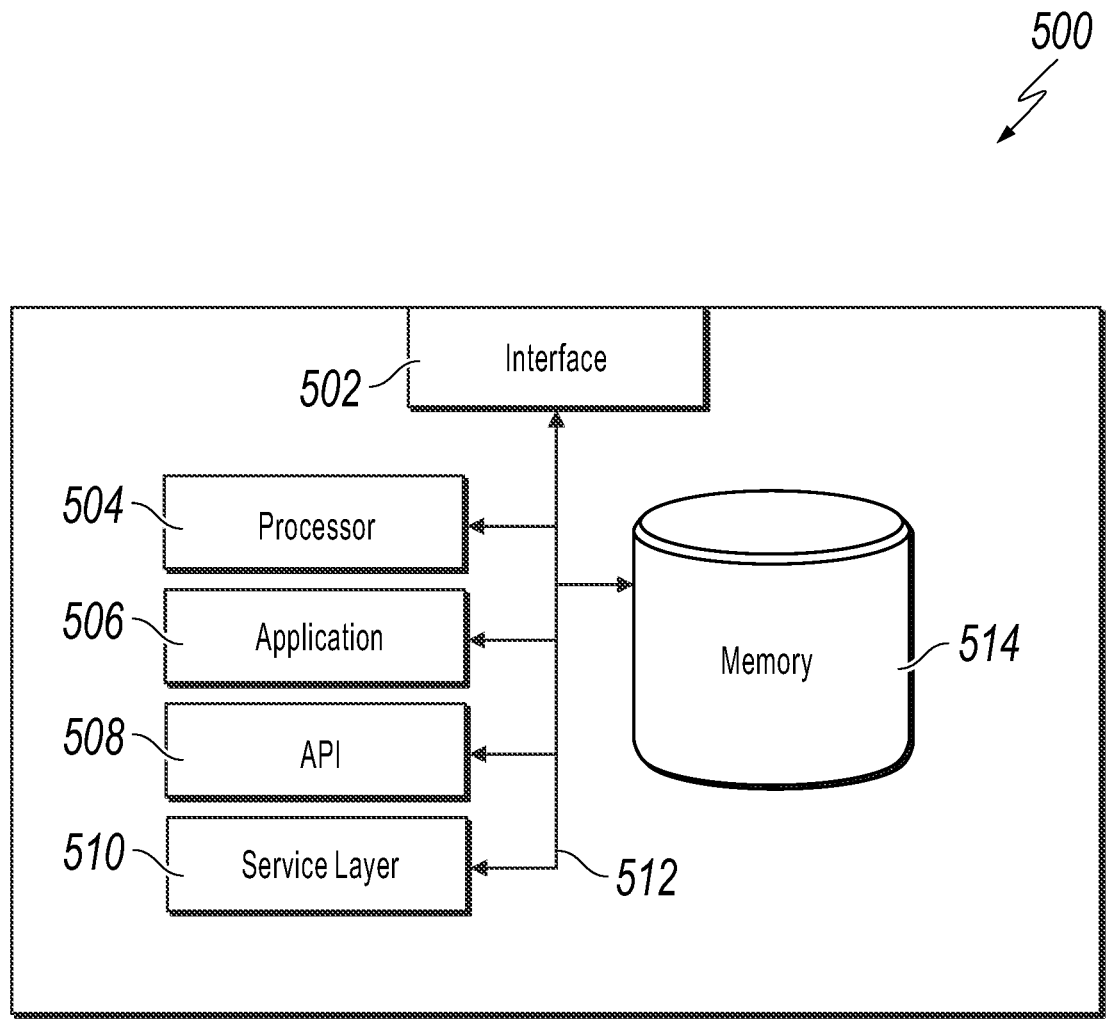
FIG. 5 illustrates a high level architecture block diagram of a server according to an implementation.

FIG. 5 illustrates a high level architecture block diagram of a server 500 according to an implementation. The server 500 can be implemented as one of the web servers 140 of FIG. 1. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The server 500 includes a computing system configured to process collect training events, generate and maintain event tree data structure, determine a traversed path for a to-be-scored event, and compute an anomaly score for the to-be-scored event, or any combinations thereof. In some cases, the processing algorithm of the anomaly detection can be implemented in an executable computing code, e.g., C/C++ executable codes. In some cases, the server 500 can include a standalone Linux system that runs batch applications. In some cases, the server 500 can include mobile or personal computers.

The server 500 may comprise a computer that includes an input device, such as a keypad, keyboard, touch screen, microphone, speech recognition device, other device that can accept user information, and/or an output device that conveys information associated with the operation of the computer, including digital data, visual and/or audio information, or a GUI.

The server 500 can serve as a client, network component, a server, a database or other persistency, and/or any other components. In some implementations, one or more components of the server 500 may be configured to operate within a cloud-computing-based environment.

At a high level, the server 500 is an electronic computing device operable to receive, transmit, process, store, or manage data. According to some implementations, the server 500 can also include or be communicably coupled with an application server, e-mail server, web server, caching server, streaming data server, business intelligence (BI) server, and/or other server.

The server 500 can collect data of network events or mobile application usage events over network 130 from a client application. In addition, data can be collected by the server 500 from internal users (e.g., from a command console or by another appropriate access method), external or third parties, other automated applications, as well as any other appropriate entities, individuals, systems, or computers.

Each of the components of the server 500 can communicate using a system bus 512. In some implementations, any and/or all the components of the server 500, both hardware and/or software, may interface with each other and/or the interface 502 over the system bus 512 using an application programming interface (API) 508 and/or a service layer 510. The API 508 may include specifications for routines, data structures, and object classes. The API 508 may be either computer language-independent or -dependent and refer to a complete interface, a single function, or even a set of APIs. The service layer 510 provides software services to the server 500. The functionality of the server 500 may be accessible for all service consumers using this service layer. Software services, such as those provided by the service layer 510, provide reusable, defined business functionalities through a defined interface. For example, the interface may be software written in JAVA, C++, or other suitable languages providing data in Extensible Markup Language (XML) format or other suitable format. While illustrated as an integrated component of the servers 500, alternative implementations may illustrate the API 508 and/or the service layer 510 as stand-alone components in relation to other components of the server 500. Moreover, any or all parts of the API 508 and/or the service layer 510 may be implemented as child or sub-modules of another software module, enterprise application, or hardware module without departing from the scope of this disclosure.

The server 500 includes an interface 502. Although illustrated as a single interface 502 in FIG. 5, two or more interfaces 502 may be used according to particular needs, desires, or particular implementations of the server 500. The interface 502 is used by the server 500 for communicating with other systems in a distributed environment connected to a network (whether illustrated or not). Generally, the interface 502 comprises logic encoded in software and/or hardware in a suitable combination and operable to communicate with the network. More specifically, the interface 502 may comprise software supporting one or more communication protocols associated with communications such that the network or interface's hardware is operable to communicate physical signals within and outside of the server 500.

The server 500 includes at least one processor 504. Although illustrated as a single processor 504 in FIG. 5, two or more processors may be used according to particular needs, desires, or particular implementations of the server. Generally, the processor 504 executes instructions and manipulates data to perform the operations of the server 500. Specifically, the processor 504 executes the functionality required for anomaly detection.

The server 500 also includes a memory 514 that holds data for the server 500. Although illustrated as a single memory 514 in FIG. 5, two or more memories may be used according to particular needs, desires, or particular implementations of the server 500. While memory 514 is illustrated as an integral component of the server 500, in alternative implementations, memory 514 can be external to the server 500.

The application 506 is an algorithmic software engine providing functionality according to particular needs, desires, or particular implementations of the server 500, particularly with respect to functionality required for anomaly detection. Although illustrated as a single application 506, the application 506 may be implemented as multiple applications 506 on the server 500. In addition, although illustrated as integral to the server 500, in alternative implementations, the application 506 can be external to the server 500.

There may be any number of the server 500 associated with, or external to, and communicating over a network. Further, this disclosure contemplates that many users may use one server 500, or that one user may use multiple servers 500.

Figure 6:
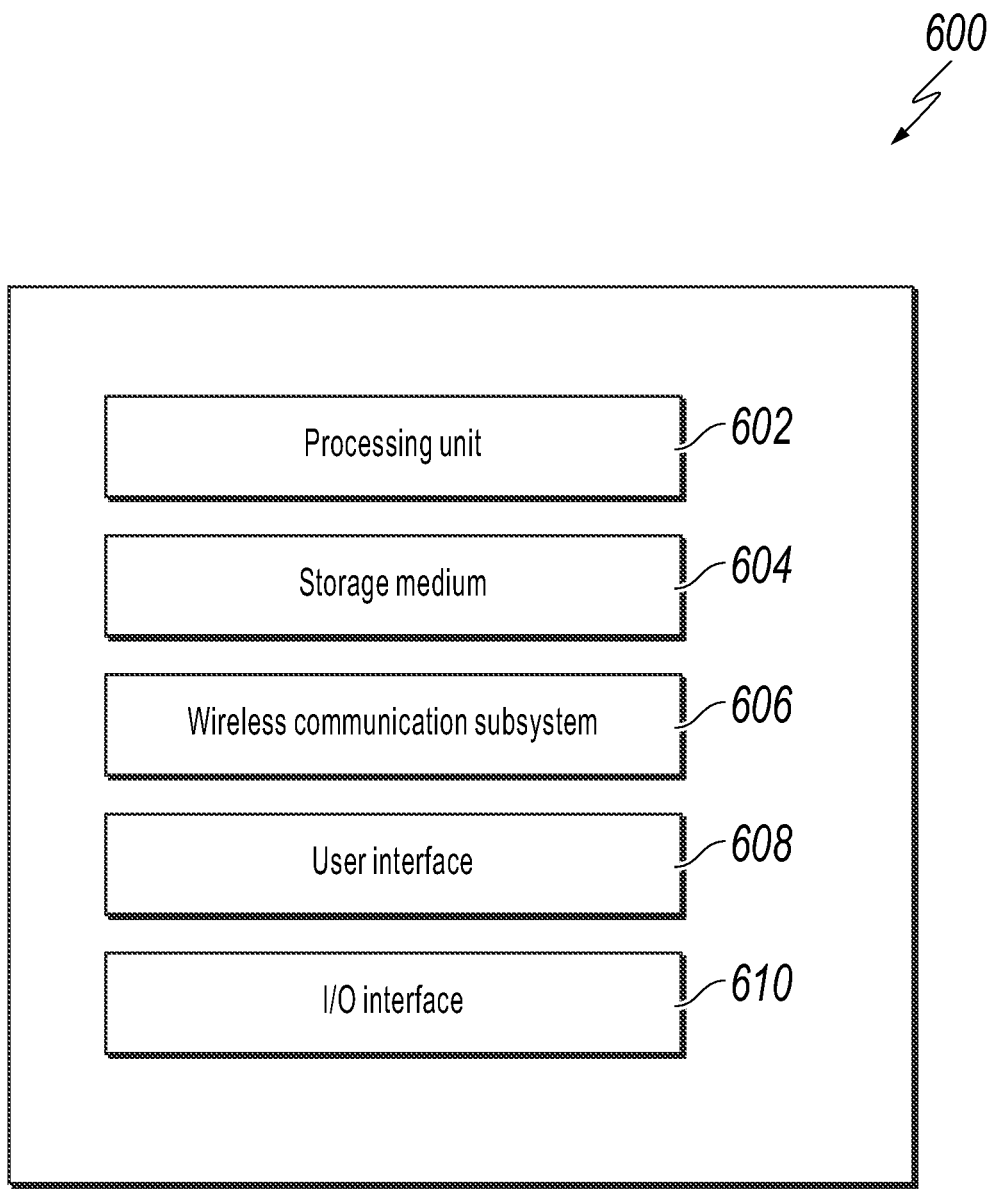
FIG. 6 is a block diagram illustrating an example user device according to an implementation.

FIG. 6 is a block diagram illustrating an example user device 600 according to an implementation. The example user device 600 can be implemented as the 120 of FIG. 1. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The illustrated device 600 includes a processing unit 602, a computer-readable storage medium 604 (for example, read-only memory (ROM) or flash memory), a wireless communication subsystem 606, a user interface 608, and an I/O interface 610.

The processing unit 602 can include one or more processing components (alternatively referred to as "processors" or "central processing units" (CPUs)) configured to execute instructions related to one or more of the processes, steps, or actions described herein in connection with one or more of the implementations disclosed herein. In some implementations, the processing unit 602 may be configured to generate control information, such as a measurement report, or to respond to received information, such as control information from a network node. The processing unit 602 may also be configured to make a Radio Resource Management (RRM) decision such as cell selection/reselection information, or trigger a measurement report. The processing unit 602 can also include other auxiliary components, such as random access memory (RAM) and ROM.

The computer-readable storage medium 604 can store an operating system (OS) of the device 700 and various other computer-executable instructions, logic or software programs for performing one or more of the processes, steps, or actions described above. In some cases, the computer-readable storage medium 604 can be transitory, non-transitory, or a combination thereof.

The wireless communication subsystem 606 may be configured to provide wireless communication for voice, data, and/or control information provided by the processing unit 602. The wireless communication subsystem 606 can include, for example, one or more antennas, a receiver, a transmitter, a local oscillator, a mixer, and a DSP unit. In some implementations, the subsystem 606 can support MIMO transmissions. In some implementations, the receiver in the wireless communication subsystems 606 can be an advanced receiver or a baseline receiver. Two receivers can be implemented with identical, similar, or different receiver processing algorithms.

The user interface 608 can include, for example, one or more of a screen or touch screen (for example, a liquid crystal display (LCD), a light emitting display (LED), an organic light emitting display (OLED), a micro-electromechanical system (MEMS) display), a keyboard or keypad, a trackball, a speaker, and a microphone. The I/O interface 610 can include, for example, a universal serial bus (USB) interface.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatus with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers, executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a ROM or a RAM or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a PDA, a mobile audio or video player, a game console, a GPS receiver, or a portable storage device, e.g., a USB flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD, LED, or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., such as a data server, or that includes a middleware component, e.g., an application server, or that includes a front-end component, e.g., a client computer having a graphical user interface or a Web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a WLAN using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship with each other.

In some implementations, any or all of the components of the computing system, both hardware and/or software, may interface with each other and/or the interface using an API and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in XML format or other suitable formats. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
   obtaining a data structure represented by a decision tree, wherein the data structure represented by the decision tree is generated based on a plurality of training events, wherein each of the plurality of training events has a plurality of attributes, and wherein each of the plurality of attributes has an attribute value, wherein the decision tree comprises a plurality of event nodes comprising a root node, one or more non-leaf nodes, and one or more branches, and one or more leaf nodes, wherein each of the plurality of event nodes represents one of the plurality of attributes and one of a plurality of attribute values, wherein each of the one or more branches below a non-leaf node represents an attribute value of an attribute represented by the non-leaf node, wherein each of the plurality of attributes is associated with an importance level for detecting anomalies, wherein the one or more nodes are arranged in the decision tree based on the importance level of the plurality of attributes, and wherein a first node representing a first attribute having a first importance level is positioned at a higher layer than a second node representing a second attribute having a second importance level when the first importance level is more important than the second importance level;
   obtaining a to-be-scored event, wherein the to-be-scored event has one or more attributes of the plurality of attributes and one or more attribute values;
   determining a traversed path for the to-be-scored event by mapping the one or more attributes and the one or more attribute values of the to-be-scored event to the decision tree, wherein the mapping comprises:
      determining whether the to-be-scored event has a first attribute value for the first attribute having the first importance level;
      in response to determining that the to-be-scored event has the first attribute value for the first attribute having the first importance level, determining whether the first attribute value for the first attribute matches an attribute value of a branch associated with the root node;
      in response to determining that the to-be-scored event has the first attribute value for the first attribute having the first importance level matches the attribute value of a branch associated with the root node, determining a child node associated with the branch as a first child node for the to-be-scored event;
      determining whether the to-be-scored event has a second attribute value for the second attribute having the second importance level;
      determining a second child node for the to-be-scored event based on matching the second attribute value for the second attribute having the second importance level with attribute values of child nodes of the first child node, wherein the second child node is a child node of the first child node;
      determining whether the to-be-scored event has a third attribute value for a third attribute having a third importance level, wherein the second importance level is more important than the third importance level; and
      determining a third child node for the to-be-scored event based on matching the third attribute value for the third attribute having the third importance level with attribute values of child nodes of the second child node, wherein the third child node is a child node of the second child node;
   computing an anomaly score of the to-be-scored event based on the traversed path, wherein the computing the anomaly score comprises:
      determining a path length of each node on the traversed path;
      determining a path length of the to-be-scored event by summing the path length of each node on the traversed path; and
      determining the anomaly score based on the path length of the to-be-scored event relative to an average path length;
   determining whether the to-be-scored event is an anomalous event based on the anomaly score; and
   identifying a compromised device based on the anomaly score.

2. The computer-implemented method of claim 1, wherein each of the one or more leaf nodes or the one or more non-leaf nodes is associated with a permutation of attribute values occurring in the plurality of training events for one or more of the plurality of attributes.

3. The computer-implemented method of claim 2, wherein each of the one or more non-leaf nodes is a parent node associated with at least one branch of the decision tree based on a number of child nodes associated with the parent node.

4. The computer-implemented method of claim 3, wherein each of the one or more leaf nodes is a child node of a non-leaf node of the decision tree, wherein each of the one or more leaf nodes is associated with one branch of the decision tree, and wherein each of the one or more leaf nodes has no child node.

5. The computer-implemented method of claim 4, wherein child nodes of a non-leaf node are associated with branches represented by different attribute values.

6. The computer-implemented method of claim 4, wherein a child node of a non-leaf node represents a subset of training events mapped to a parent node of the child node.

7. The computer-implemented method of claim 2, wherein a non-leaf node of the decision tree that represents an attribute having a highest importance level is a root node of the decision tree.

8. The computer-implemented method of claim 1, wherein determining the traversed path for the to-be-scored event comprises:
determining a plurality of leaf nodes and non-leaf nodes in the decision tree that are mapped to the to-be-scored event based on the importance level of the one or more attributes of the to-be-scored event.

9. An electronic device, comprising:
a memory; and
at least one hardware processor communicatively coupled with the memory and configured to perform operations comprising:
obtaining a data structure represented by a decision tree, wherein the data structure represented by the decision tree is generated based on a plurality of training events, wherein each of the plurality of training events has a plurality of attributes, and wherein each of the plurality of attributes has an attribute value, wherein the decision tree comprises a plurality of event nodes comprising a root node, one or more non-leaf nodes, and one or more branches, and one or more leaf nodes, wherein each of the plurality of event nodes represents one of the plurality of attributes and one of a plurality of attribute values, wherein each of the one or more branches below a non-leaf node represents an attribute value of an attribute represented by the non-leaf node, wherein each of the plurality of attributes is associated with an importance level for detecting anomalies, wherein the one or more nodes are arranged in the decision tree based on the importance level of the plurality of attributes, and wherein a first node representing a first attribute having a first importance level is positioned at a higher layer than a second node representing a second attribute having a second importance level when the first importance level is more important than the second importance level;
obtaining a to-be-scored event, wherein the to-be-scored event has one or more attributes of the plurality of attributes and one or more attribute values;
determining a traversed path for the to-be-scored event by mapping the one or more attributes and the one or more attribute values of the to-be-scored event to the decision tree, wherein the mapping comprises:
determining whether the to-be-scored event has a first attribute value for the first attribute having the first importance level;
in response to determining that the to-be-scored event has the first attribute value for the first attribute having the first importance level, determining whether the first attribute value for the first attribute matches an attribute value of a branch associated with the root node;
in response to determining that the to-be-scored event has the first attribute value for the first attribute having the first importance level matches the attribute value of a branch associated with the root node, determining a child node associated with the branch as a first child node for the to-be-scored event;
determining whether the to-be-scored event has a second attribute value for the second attribute having the second importance level;
determining a second child node for the to-be-scored event based on matching the second attribute value for the second attribute having the second importance level with attribute values of child nodes of the first child node, wherein the second child node is a child node of the first child node;
determining whether the to-be-scored event has a third attribute value for a third attribute having a third importance level, wherein the second importance level is more important than the third importance level; and
determining a third child node for the to-be-scored event based on matching the third attribute value for the third attribute having the third importance level with attribute values of child nodes of the second child node, wherein the third child node is a child node of the second child node;
computing an anomaly score of the to-be-scored event based on the traversed path, wherein the computing the anomaly score comprises:
determining a path length of each node on the traversed path;
determining a path length of the to-be-scored event by summing the path length of each node on the traversed path; and
determining the anomaly score based on the path length of the to-be-scored event relative to an average path length;
determining whether the to-be-scored event is an anomalous event based on the anomaly score; and
identifying a compromised device based on the anomaly score.

10. The electronic device of claim 9, wherein each of the one or more leaf nodes or the one or more non-leaf nodes is associated with a permutation of attribute values occurring in the plurality of training events for one or more of the plurality of attributes.

11. The electronic device of claim 10, wherein each of the one or more non-leaf nodes is a parent node associated with at least one branch of the decision tree based on a number of child nodes associated with the parent node.

12. The electronic device of claim 11, wherein each of the one or more leaf nodes is a child node of a non-leaf node of the decision tree, wherein each of the one or more leaf nodes is associated with one branch of the decision tree, and wherein each of the one or more leaf nodes has no child node.

13. The electronic device of claim 12, wherein child nodes of a non-leaf node are associated with branches represented by different attribute values.

14. The electronic device of claim 12, wherein a child node of a non-leaf node represents a subset of training events mapped to a parent node of the child node.

15. A non-transitory computer-readable medium containing instructions which, when executed, cause a computing device to perform operations comprising:
  obtaining a data structure represented by a decision tree, wherein the data structure represented by the decision tree is generated based on a plurality of training events, wherein each of the plurality of training events has a plurality of attributes, and wherein each of the plurality of attributes has an attribute value, wherein the decision tree comprises a plurality of event nodes comprising a root node, one or more non-leaf nodes, and one or more branches, and one or more leaf nodes, wherein each of the plurality of event nodes represents one of the plurality of attributes and one of a plurality of attribute values, wherein each of the one or more branches below a non-leaf node represents an attribute value of an attribute represented by the non-leaf node, wherein each of the plurality of attributes is associated with an importance level for detecting anomalies, wherein the one or more nodes are arranged in the decision tree based on the importance level of the plurality of attributes, and wherein a first node representing a first attribute having a first importance level is positioned at a higher layer than a second node representing a second attribute having a second importance level when the first importance level is more important than the second importance level;
  obtaining a to-be-scored event, wherein the to-be-scored event has one or more attributes of the plurality of attributes and one or more attribute values;
  determining a traversed path for the to-be-scored event by mapping the one or more attributes and the one or more attribute values of the to-be-scored event to the decision tree, wherein the mapping comprises:
    determining whether the to-be-scored event has a first attribute value for the first attribute having the first importance level;
    in response to determining that the to-be-scored event has the first attribute value for the first attribute having the first importance level, determining whether the first attribute value for the first attribute matches an attribute value of a branch associated with the root node;
    in response to determining that the to-be-scored event has the first attribute value for the first attribute having the first importance level matches the attribute value of a branch associated with the root node, determining a child node associated with the branch as a first child node for the to-be-scored event;
    determining whether the to-be-scored event has a second attribute value for the second attribute having the second importance level;
    determining a second child node for the to-be-scored event based on matching the second attribute value for the second attribute having the second importance level with attribute values of child nodes of the first child node, wherein the second child node is a child node of the first child node;
    determining whether the to-be-scored event has a third attribute value for a third attribute having a third importance level, wherein the second importance level is more important than the third importance level; and
    determining a third child node for the to-be-scored event based on matching the third attribute value for the third attribute having the third importance level with attribute values of child nodes of the second child node, wherein the third child node is a child node of the second child node;
  computing an anomaly score of the to-be-scored event based on the traversed path, wherein the computing the anomaly score comprises:
    determining a path length of each node on the traversed path;
    determining a path length of the to-be-scored event by summing the path length of each node on the traversed path; and
    determining the anomaly score based on the path length of the to-be-scored event relative to an average path length;
  determining whether the to-be-scored event is an anomalous event based on the anomaly score; and
  identifying a compromised device based on the anomaly score.

16. The non-transitory computer-readable medium of claim 15, wherein each of the one or more leaf nodes or the one or more non-leaf nodes is associated with a permutation of attribute values occurring in the plurality of training events for one or more of the plurality of attributes.

17. The non-transitory computer-readable medium of claim 16, wherein each of the one or more non-leaf nodes is a parent node associated with at least one branch of the decision tree based on a number of child nodes associated with the parent node.

18. The non-transitory computer-readable medium of claim 17, wherein each of the one or more leaf nodes is a child node of a non-leaf node of the decision tree, wherein each of the one or more leaf nodes is associated with one branch of the decision tree, and wherein each of the one or more leaf nodes has no child node.

19. The non-transitory computer-readable medium of claim 18, wherein child nodes of a non-leaf node are associated with branches represented by different attribute values.

20. The non-transitory computer-readable medium of claim 18, wherein a child node of a non-leaf node represents a subset of training events mapped to a parent node of the child node.

* * * * *